(12) United States Patent
Daly et al.

(10) Patent No.: US 8,712,093 B2
(45) Date of Patent: *Apr. 29, 2014

(54) MILLIMETER WAVE IMAGING METHOD AND SYSTEM TO DETECT CONCEALED OBJECTS

(75) Inventors: Robert Daly, Orlando, FL (US); Ernesto Barrantes, Orlando, FL (US)

(73) Assignee: Microsemi Corporation, Aliso Viejo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/540,340

(22) Filed: Jul. 2, 2012

(65) Prior Publication Data

US 2012/0288137 A1 Nov. 15, 2012

Related U.S. Application Data

(63) Continuation of application No. 11/835,886, filed on Aug. 8, 2007, now Pat. No. 8,213,672.

(51) Int. Cl.
*G06K 9/00* (2006.01)

(52) U.S. Cl.
USPC .......................................................... 382/100

(58) Field of Classification Search
None
See application file for complete search history.

(56) References Cited

U.S. PATENT DOCUMENTS

| | | | |
|---|---|---|---|
| 5,379,336 A | 1/1995 | Kramer et al. | |
| 5,606,283 A | 2/1997 | Allen et al. | |
| 5,821,987 A * | 10/1998 | Larson | 348/14.15 |
| 5,933,120 A | 8/1999 | Manasson et al. | |
| 5,982,326 A | 11/1999 | Chow et al. | |
| 6,154,174 A | 11/2000 | Snider et al. | |
| 7,873,182 B2 | 1/2001 | Andrew et al. | |
| 6,677,571 B1 | 1/2004 | Clark et al. | |
| 6,777,684 B1 | 8/2004 | Volkov et al. | |
| 6,834,991 B2 | 12/2004 | Roeder | |
| 6,900,756 B2 | 5/2005 | Salmon | |
| 7,075,080 B2 | 7/2006 | Vaidya | |
| 7,088,086 B2 | 8/2006 | Ammar | |
| 7,132,649 B2 | 11/2006 | Vaidya | |
| 7,180,441 B2 | 2/2007 | Rowe et al. | |
| 7,239,122 B2 | 7/2007 | Ammar | |
| 8,213,672 B2 * | 7/2012 | Daly et al. | 382/100 |
| 2002/0044276 A1 * | 4/2002 | Stoner et al. | 356/141.1 |
| 2002/0090184 A1 | 7/2002 | Sayag | |
| 2004/0057496 A1 | 3/2004 | Roeder | |

(Continued)

OTHER PUBLICATIONS

Sheen et al., "Three-Dimensional Millimeter Wave Imaging for Concealed Weapon Detection," IEEE transaction on Microwave Theory and Techniques, vol. 49, No. 9, Sep. 2001, pp. 1581-1592.

*Primary Examiner* — Tahmina Ansari
(74) *Attorney, Agent, or Firm* — Simon Kahn

(57) ABSTRACT

The invention provides for an expandable multi channel radiometer imaging method and system. The imaging system includes a scanner for reflecting millimeter wave energy emanating from a pre-determined scene. The millimeter wave energy is focused to a focal plane array using an optical lens and a multi channel radiometer receives the millimeter wave energy. The focal plane array is formed by a plurality of pixels that each includes a single low noise amplifier. The number of pixels of the focal plane array is expendable to increase the resolution of a millimeter wave image. A virtual grid of cells is formed representing different values of millimeter wave energy within the imaging zone. Algorithms calculate differences of millimeter wave energy between cells of said virtual grid to display a composite image to identify concealed objects on an individual.

9 Claims, 7 Drawing Sheets

(56) References Cited

U.S. PATENT DOCUMENTS

| | | |
|---|---|---|
| 2004/0066327 A1 | 4/2004 | Salmon |
| 2005/0122254 A1 | 6/2005 | Ammar |
| 2005/0230604 A1 | 10/2005 | Rowe et al. |
| 2006/0088000 A1* | 4/2006 | Hannu et al. ................... 370/328 |
| 2006/0104480 A1* | 5/2006 | Fleisher ........................ 382/103 |
| 2006/0164064 A1 | 7/2006 | Ammar |
| 2007/0001895 A1* | 1/2007 | Kolinko et al. ................. 342/22 |
| 2007/0080850 A1* | 4/2007 | Abe et al. ........................ 342/52 |
| 2007/0232222 A1* | 10/2007 | de Jong ........................ 455/3.06 |
| 2009/0041292 A1 | 2/2009 | Daly et al. |
| 2009/0041293 A1 | 2/2009 | Andrew et al. |
| 2009/0060272 A1 | 3/2009 | Reinpoldt, III |
| 2009/0251355 A1 | 10/2009 | Nanami |
| 2010/0306701 A1* | 12/2010 | Glen ............................. 715/810 |

* cited by examiner

MILLIMETER WAVE IMAGING METHOD AND SYSTEM TO DETECT CONCEALED OBJECTS

RELATED APPLICATIONS

This application is a continuation of pending U.S. patent application Ser. No. 11/835,886, filed Aug. 8, 2007, entitled "Millimeter Wave Imaging Method and System to Detect concealed Objects," which is hereby incorporated by reference into this application.

BACKGROUND OF THE INVENTION

1. Field of the Invention

The present invention relates generally to security systems, and more specifically to a multi channel radiometer that is expandable to increase the number of pixels and utilizes single pixel subassemblies to increase the functional test yield performance.

2. Description of the Prior Art

Security systems can be found at transportation centers such as airports, train stations or at other public facilities such as courthouses, government buildings, or public schools. One of the principal concerns of operators of security systems is the need to protect security personnel and other individuals (e.g. the general public) in the course of conducting a search of a person for concealed objects. The concealed objects that present a danger are weapons, explosives, contraband and other similar items.

Prior art security systems include metal or chemical residue detectors that require security personnel to be in proximity of the individual. One or more security personnel are required to conduct a hands-on or "wand-based" scan of an individual for whom the metal or chemical residue detector has generated an alarm. An inherent deficiency of this type of security system is the fact that it exposes not only the security personnel to danger, but also other individuals (e.g., travelers in an airport) in the vicinity of the security system to the dangers posed by such concealed objects. Accordingly, there is a need in the relevant art for a security system that has the ability to perform from a stand-off perspective so that security personnel and innocent by-standers are not exposed to any potential threat or danger.

The radiometer that is subject of this invention relates to millimeter wave engineering. This means that circuit elements must be scaled down such that passive elements and interconnects are fabricated on the same semiconductor substrate as the active devices to create a Monolithic Millimeter-wave Integrated Circuit ("MMIC"). The microscopic circuit elements are defined through photolithography from a scaled up mask to eliminate parasitics associated with component packages, leads and solder pads. The MMIC is smaller in mass and volume compared to conventional circuit assemblies. In addition, MMIC provides high performance.

Although there are advantages to using a MMIC, including low fabrication costs, there are also significant disadvantages. One significant disadvantage is that post fabricating tuning of circuit elements is not practical. More complex circuit designs require multiple iterations before acceptable performance is achieved and MMIC fabrication requires extremely long iteration times. Further, MMIC research and development requires specialized equipment such as wafer probes, probe stations, and wire bonders. Also, synthesized signal sources or spectrum analyzers makes circuit measurements difficult. Accordingly, there is a need in the art to improve the design and reliability of fabricated MMIC for radiometers to achieve acceptable performance of subassemblies.

Operating millimeter wave frequencies are between 30 and 300 GHz. The higher the frequency results in higher adsorption. The relatively high adsorption of the millimeter wave band makes long distance wireless communication not practical. However, the high adsorption of millimeter wave frequencies is attractive for other purposes. This includes the detection of concealed objects under an individual's clothing. Accordingly, radiometers have been developed using MMIC technology to detect millimeter wave frequencies for that purpose.

A millimeter wave imaging radiometer uses passive detection and measurement of electromagnetic radiation at millimeter wavelengths. The contrast in radiation between the surrounding background environment and individual undergoing a scan identifies concealed objects under clothing.

As part of the radiometer, a conical feedhorn is commonly used. Feedhorns are packed close together in the focal plane. The feedhorn defines the detector field of view and gives a tapered illumination of the scene. Maximum efficiency for the detection of a point source is achieved for a feedhorn diameter is close to $2F\lambda$ where F is the focal ratio of the final optics and $\lambda$ is the wavelength. To fully sample the image plane requires the feedhorn diameter and spacing to be $0.5F\lambda$. Feedhorns are readily understood in terms of their control of the beam coupling, are easy to fabricate, and offer good rejection of electromagnetic interference as the feedhorn and detector cavity act as a Faraday enclosure.

Typically, a large number of radiometer feedhorns are arranged into a focal plane array for contiguous imaging of an individual. A focal plane array is a two-dimensional array of detectors placed in the focal plane of a lens and used to collect information about an image positioned some distance from the lens. The choice of pixel architecture of a radiometer is critical to the design on a focal plane array where each pixel is coupled to the feedhorn.

Passive radiometers are sensitive to noise, therefore, MMIC low noise amplifiers ("LNA") are critical components. Typically, a large number of LNAs are required for an imaging radiometer. Accordingly, a shortcoming of the prior art is that if an LNA fails as part of a subassembly of a series of LNAs, that results in the loss of the entire subassembly.

There have been attempts to improve radiometer imaging systems such that improved performance and reliability is achieved. By way of example, note U.S. Pat. No. 6,777,684 to Volkov et al., which discloses an apparatus that includes a source of radiation as part of the imaging system. A shortcoming of this prior art is that it uses an active radiation source thereby subjecting an individual to additional radiation exposure.

Another example is U.S. Pat. No. 7,132,648 to Vaidya, which is directed to improving the quality of a millimeter wave image using a set number of pixels. This is accomplished by compensating for the variation of the output signals from each channel receiving radiant energy emanating from a scene. However, the radiometer of Vaidya is not expandable to increase the number of pixels and thereby the resolution of an image.

U.S. Pat. No. 7,008,086 to Ammar discloses a radiometer that uses a combination of hybrid, low noise amplifiers (LNAs) in series. A shortcoming of this prior art is that it comprises a series of LNAs wherein one failed LNA of the series results in a completely failed subassembly and resultant increased fabrication costs.

It is desirable to provide a real time radiometer that provides the ability to increase or decrease the number of pixels and resolution of an image using the same housing and electrical hardware. There is a need for such a radiometer having a single MMIC LNA pixel design to increase the functional yield and thereby reduce fabrication costs.

There is also a need in the art for an improved security system that is non-invasive to the individual being searched for concealed objects.

Another need exists in the art to provide an improved security system that provides synchronized images from all angles of an individual's body to locate concealed objects.

Another need exists in the art to provide an improved security system that is easy for security personnel to operate and to synchronize.

Another need exists in the art to provide an improved security system to identify non-metallic concealed objects on an individual such as explosives.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

The invention provides for an expandable multi channel radiometer imaging system. The system includes scanning an imaging zone of a scene; focusing millimeter wave energy to a focal plane array; receiving millimeter wave energy; calculating values for a grid of cells representing millimeter wave energy; analyzing differences of millimeter wave energy between cells of said grid using algorithms; recognizing contrast cells from said grid of cells; forming image of contrast cells; synchronizing said image of contrast cells with image of imaging zone in real-time; forming a composite image showing a video image of the imaging zone scene in real-time overlaid with said discrete image of contrast cells representing values of millimeter wave energy; and displaying said composite image.

The imaging zone is illuminated using one or more projection optics devices with low millimeter wave energy that is emitted from a natural source. For example, the natural source could be a temperature-controlled container of water. The millimeter wave radiometers can then generate images representative of sensed differences or contrast in low millimeter wave energy (e.g. electromagnetic wave energy lying in the 80-100 GHz range) naturally emitted by the human body and low millimeter wave energy that is reflected by any object concealed on the individual being searched/imaged.

The millimeter wave contrast-based images are superimposed on the images of the person produced by video cameras to realize a set of composite images. Accordingly, the composite image shows both the person being searched and also any concealed object(s) revealed by the contrast-based images produced by the millimeter wave radiometers.

The operations of both the video cameras and millimeter wave radiometers of the imaging system are temporally synchronized so that their respective images correspond to multiple images of the individual produced at the same instant in time. The imaging system generates a continuous view of the individual being searched. In the preferred embodiment, a digital communication link from the video cameras and radiometers is coupled to a computer workstation for display to security personnel. The workstation display and the radiometers of the imaging system are synchronized to a common time base.

The security personnel at the workstation may execute a "start" command to control the operation of the video cameras and radiometers. A start scan command is effective to cause the video cameras and radiometers to begin scanning at an absolute time. Each image frame produced by the system includes both a timestamp and a sequence number. This information enables the workstation computer to determine whether the system is synchronized to within a prescribed tolerance or to take corrective action.

A "pause" command may be used selectively to provide adjustment of the operation of the system. For example, a pause command can be executed to the system if the workstation computer determines the lack of synchronization between the radiometers and video cameras. Accordingly, the pause command will result in the imaging system being synchronized again.

There are different configurations for the components of a radiometer. A prior art configuration is described as having a series of LNAs in sequence after a Dickey switch. It is assumed that the known good die ("KGD") is 90% for the LNAs. Accordingly, for each MMIC LNA chip that comprises three (3) LNAs, for example, only 73% of the MMIC LNA chips are anticipated to be acceptable ($0.90^3$=73%). Further, if an RF board comprises eight (8) pixels the functional test yield for the RF board is only 8% ($0.73^8$=0.08). In contrast, the present invention increases the functional yield test by omitting LNAs to only one LNA per pixel. This will optimize the number of MMIC LNA chips that are acceptable to be an estimated 90% ($0.90^1$=90%). As a result, there is increased cost savings by reducing the number of unacceptable LNA chips, and, consequentially RF boards, by using a single MMIC LNA pixel design.

Another aspect of the invention relates to the expandability of the radiometer to increase the number of pixels and resolution produced by the radiometer. This is accomplished by providing RF boards that each comprise sixteen (16) pixels and are adapted to couple together. For example, with the present invention, a radiometer initially provided with a RF board with sixteen (16) pixels can be upgraded to thirty-two (32) pixels by the addition of another RF board with sixteen (16) pixels. Accordingly, there is a cost savings by the design of the radiometer having the ability to increase the number of pixels and thereby resolution, using the same radiometer housing and other electrical hardware components.

The specific embodiments described above provide a multi channel radiometer imaging system. A primary object of the invention is to provide lower fabrication costs of millimeter wave radiometers.

Another very important object of the invention is to provide a single pixel subassembly to increase functional test yield and performance of the system.

Still another important object of the invention is to provide a radiometer having the ability to increase the number of pixels and thereby resolution, using the same radiometer housing and other electrical hardware components.

Another very important object of the invention is to provide a security system that has the ability to successfully perform without exposing security personnel and innocent by-standers to any potential threat or danger from a concealed object.

Another important object of the invention is to provide a security system that is non-invasive to the individual being searched for concealed objects.

Still another very important object of the invention is to provide an improved security system that is easy for security personnel to operate and to synchronize.

Another object of the invention is to provide an improved security system to identify non-metallic concealed objects on an individual such as explosives.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
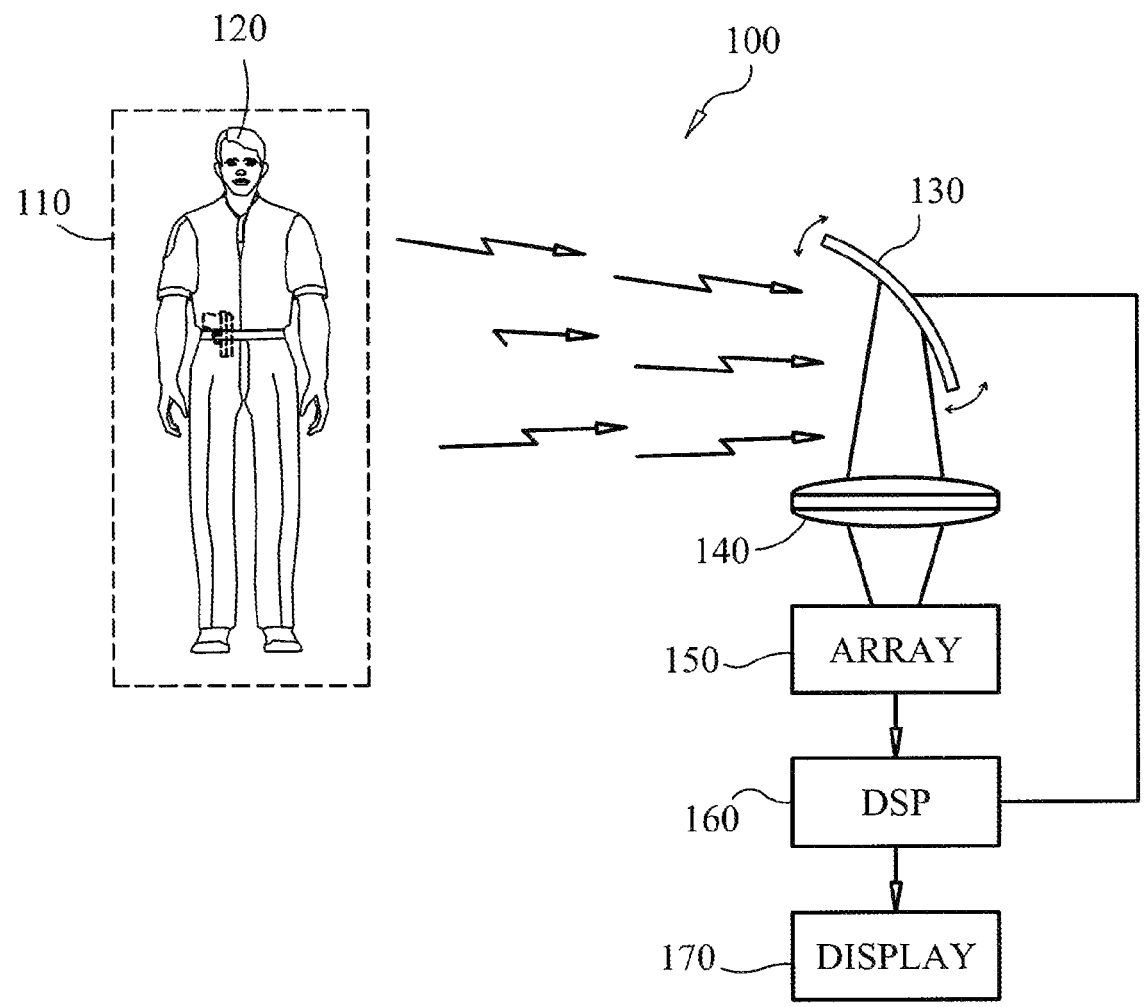
FIG. 1 diagrammatically illustrates an embodiment of the present invention.

Referring to FIG. 1, an imaging system 100 is shown in accordance with the present invention. An imaging zone 110 is formed by the area prescribed by scanning apparatus 130 that reflects millimeter wave energy 125 radiating from imaging zone 110. Scanning apparatus 130 is constrained to oscillate in a vertical plane to reflect millimeter wave energy 125. Millimeter wave energy 125 is reflected through an optical lens 140 to focus the millimeter wave energy 125 to an array of radiometers 150. A digital signal processor 160 correlates the movement of scanning apparatus 130 to specific x-y coordinates in the imaging zone 110. As described below, algorithms process the signals received by array 150 to form a composite image on display 170 showing the location of concealed objects on an individual 120.

Figure 2:
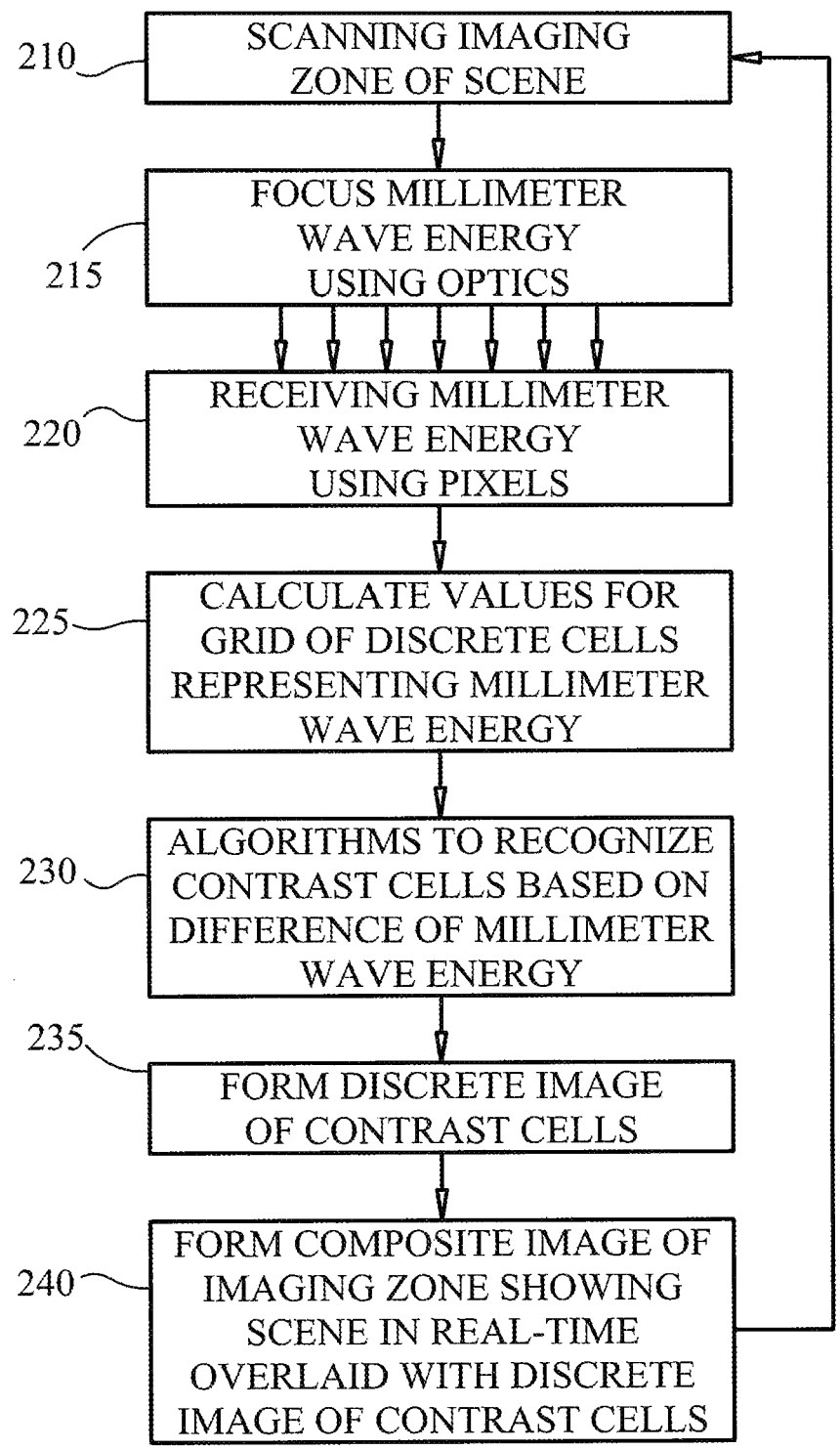
FIG. 2 provides a flowchart illustrating logic that may be used to implement a multi channel radiometer imaging system according to preferred embodiments of the present invention.

FIG. 2 shows a flow chart illustrating logic that may be used to implement preferred embodiments of the method of the present invention. As shown in FIG. 2, imaging zone is scanned 210. As the imaging zone is scanned, millimeter wave energy is focused using optics 215 onto an array of pixels adapted to receive millimeter wave energy 220. The array of pixels sends signals representing millimeter wave energy values to a CPU. Algorithms process the signals, which recognize and calculate differences of millimeter wave energy 230. A discrete image of contrast cells is formed and a millimeter wave image is generated 235. Subsequently, a real-time video image of imaging zone 110 is overlaid by the respective discrete image of contrast cells forming a composite image showing the location of concealed objects on an individual 240. In the preferred embodiment, only the area of the millimeter wave image recognized as a possible location of a concealed object on an individual overlays the real-time video image.

Figure 3:
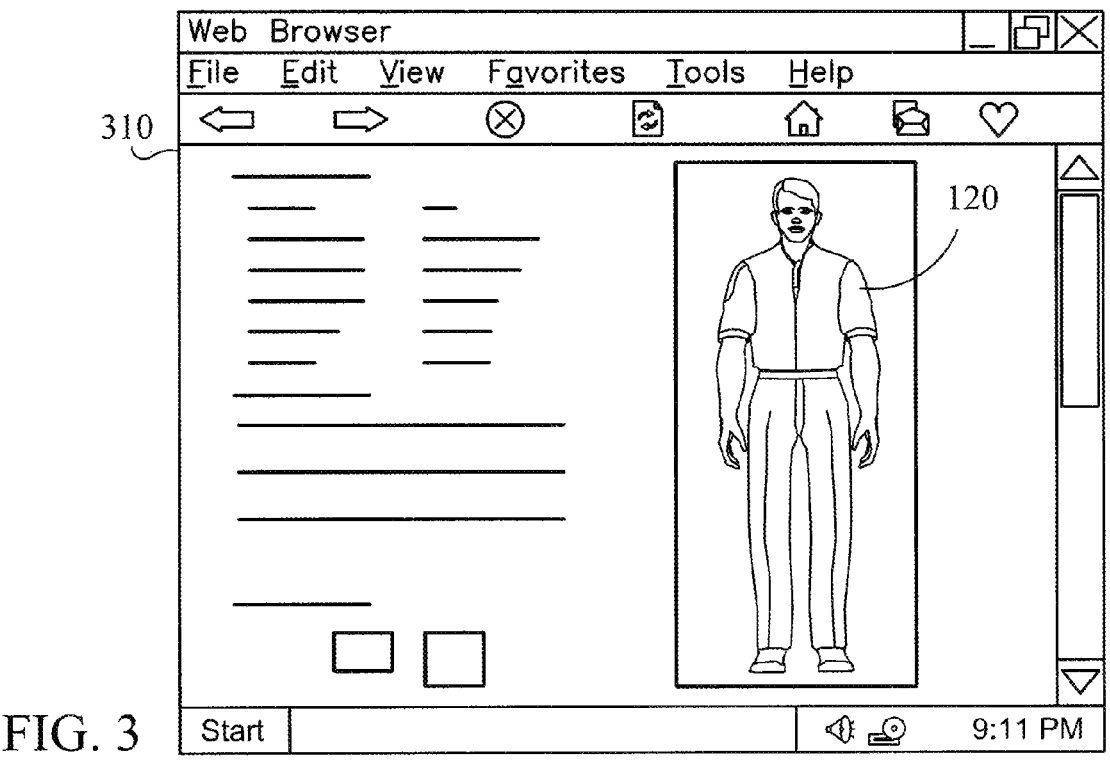
FIG. 3 shows a conceptual view of an image generated by the present invention.
Figure 4:
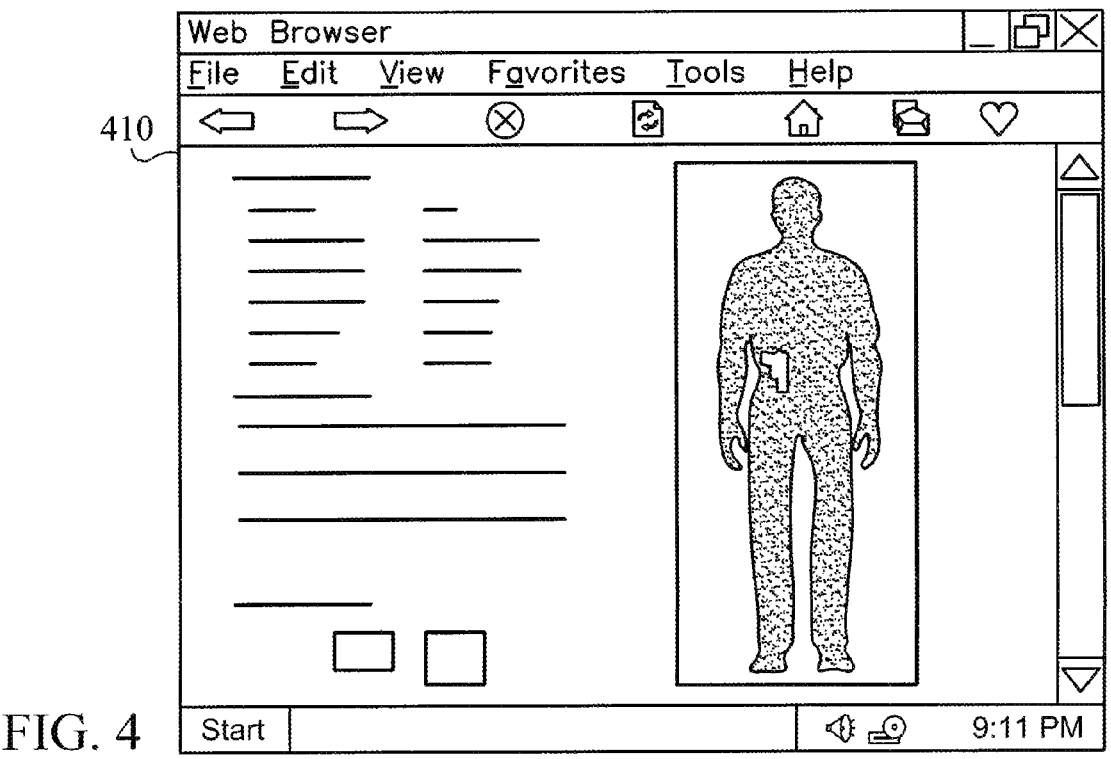
FIG. 4 shows a conceptual view of a millimeter wave image generated in accordance with the present invention.

Referring now to FIG. 3 shows a conceptual view of monitor 310 such that a real-time image 315 of an individual 120 is displayed. FIG. 4 shows a conceptual view of individual 120 on monitor 410 representing a millimeter wave image 415. A concealed object 115 on individual 120 is displayed on monitor 410, which is readily visible to security personnel. The location of concealed object 115 is determined by differences in millimeter wave energy received between individual 120 and the concealed object 115.

Figure 5:
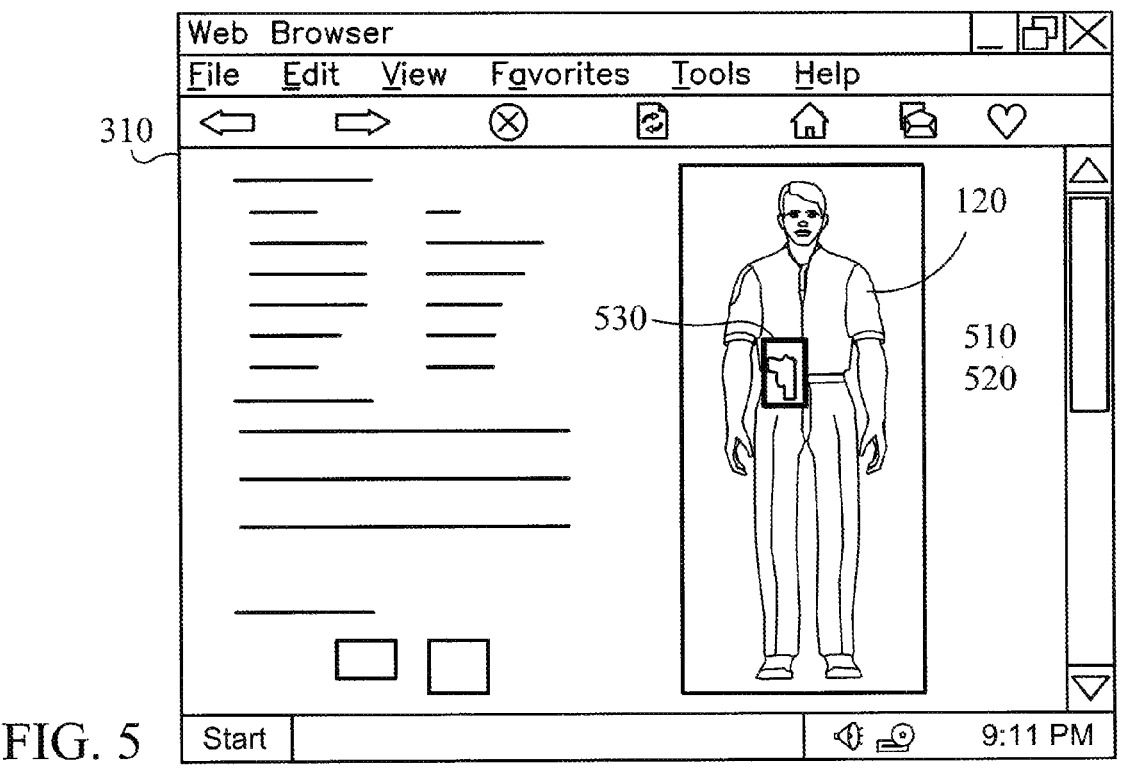
FIG. 5 shows a conceptual view of a composite image formed in accordance with the present invention.

Referring now to FIG. 5 shows a conceptual view on monitor 510 with a composite image 515 formed by real-time video image 315 overlaid by millimeter wave image 415. Composite image 515 clearly shows the location of a concealed object 115 on individual 120 and circumscribed by box 530. By only overlaying that portion of the real-time image 315 with a discrete portion of a millimeter wave image 415 allows security personnel to readily identify the person. Otherwise, millimeter wave imaging alone does not provide the level of detail to positively identify a person.

Figure 6:
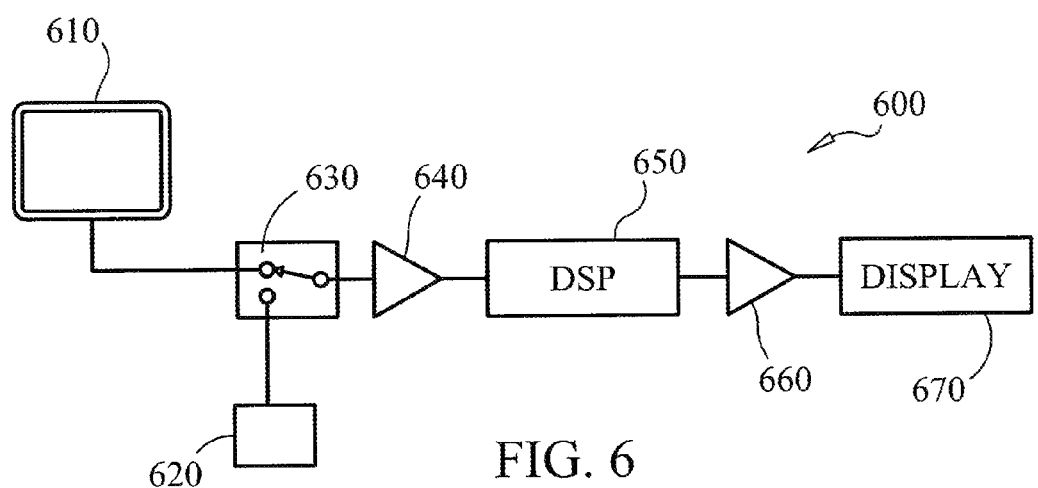
FIG. 6 provides a block diagram of a pixel of the present invention.

FIG. 6 shows a block diagram of a pixel 600 of a millimeter wave radiometer in accordance with the present invention. An antennae 610 is provided to receive millimeter wave energy. A RF switch 630 is coupled between antennae 610 and radiometer receiver 650 thereby allowing receiver 650 to alternate between antenna 610 and a known reference load termination 620. The signal from antennae 610 is amplified by a single low noise amplifier 640 followed by a video amplifier 660. The output of the video amplifier 660 is used to produce an output voltage proportional to a difference between signal received by antenna 610 and the reference temperature to generate a millimeter wave pixel image for display 670.

Figure 7:
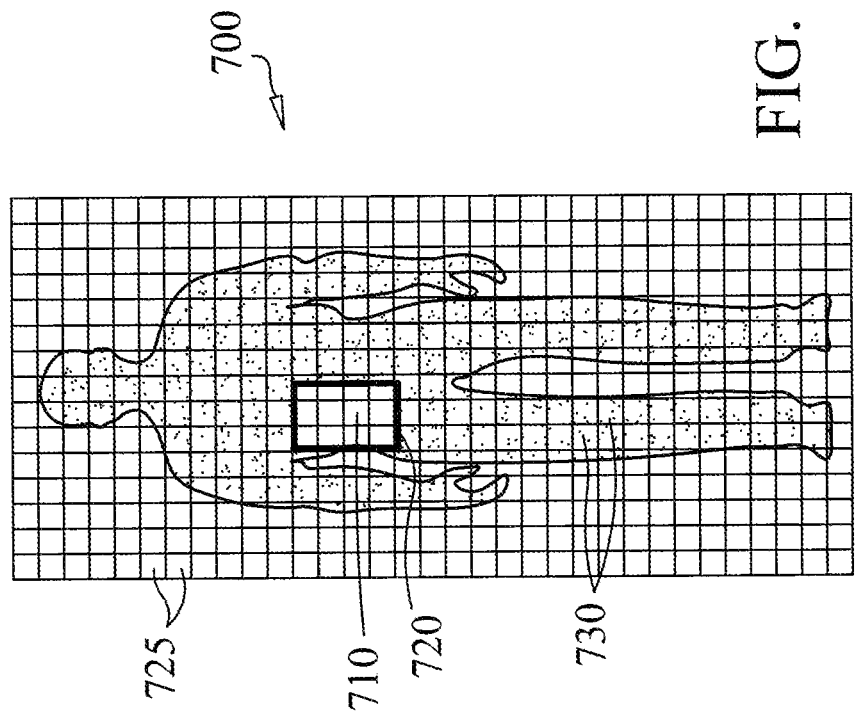
FIG. 7 shows a conceptual view of a grid formed in accordance with the present invention.

Referring to FIG. 7, a grid of discrete cells 700 is shown. Each cell represents the millimeter wave energy received by a particular pixel that represents a specific x-y coordinate within the imaging zone 110. Scene cells 725 form the background for determining the contrast between millimeter wave energy emanating from the imaging zone 110 and individual 715. The brightness of identification cells 730 are used to define the outline of individual 715 within imaging zone 110. Contrast cells 710 are identified as those cells where the contrast between solid cells 730 is such that a concealed object is revealed. Once contrast cells 720 are determined, a box 720 is formed around the contrast cells for easy identification of the concealed object by security personnel. The sensitivity of the contrast is adjustable as determined by factors such as high or low ambient temperature.

Figure 8:
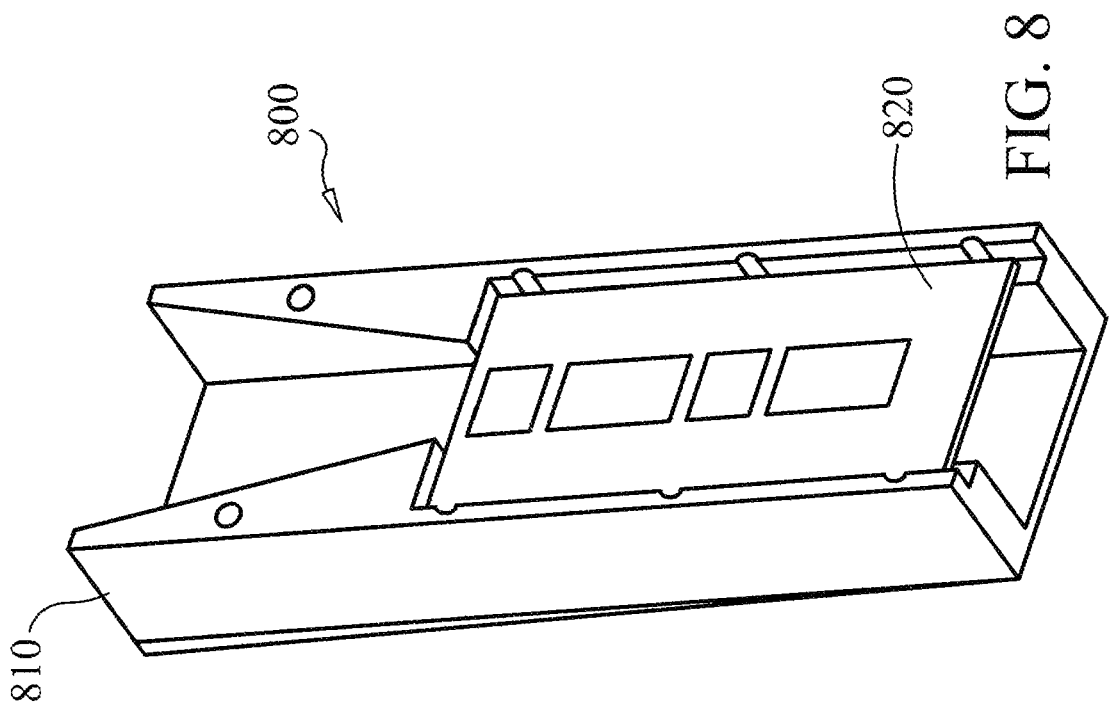
FIG. 8 provides a conceptual view of a pixel in accordance with the present invention.

FIG. 8 shows a pixel 800 of the radiometer in accordance with the present invention. In the preferred embodiment a feedhorn 810 is used as an antennae to receive millimeter wave energy. A MMIC 820 including a Dickey Switch followed by a single LNA per pixel is formed as part of pixel 800. Pixel 800 is adaptable to couple to an RF board known in the art.

Figure 9:
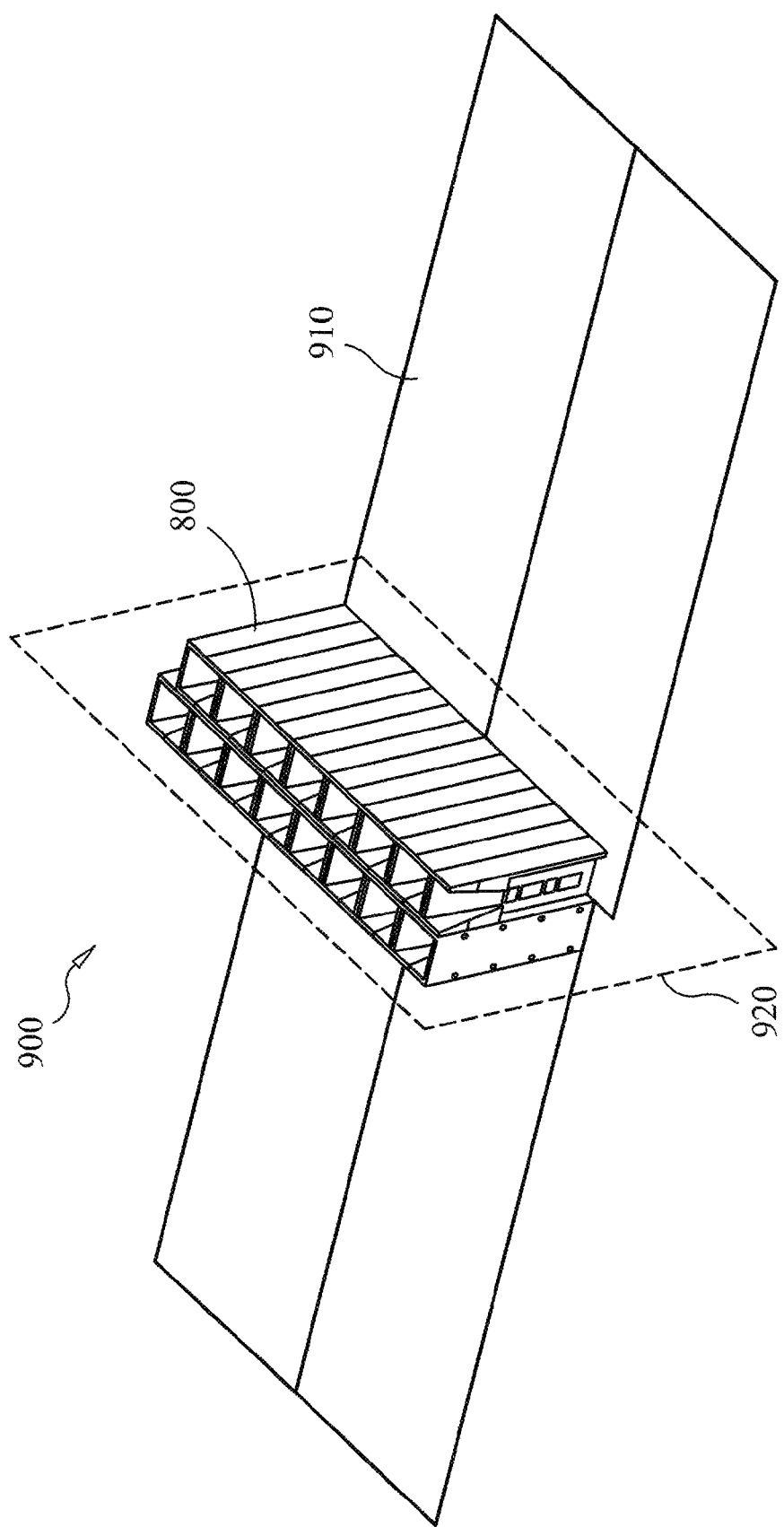
FIG. 9 shows a conceptual view of a sixteen pixel radiometer in accordance with the present invention.

Referring now to FIG. 9 is an expandable multi channel radiometer 900 in accordance with the present invention. A focal plane array 920 is formed by a plurality of pixels 800. Each pixel is in electrical communication with RF board 910 and each pixel comprises a detection channel. For clarity, the housing and certain electrical components well known in the art are not shown. The array 920 has two rows of pixels as the spacing of the pixels is limited by the size of the feedhorns. Offsetting the pixels in two rows reduces the line spacing between the center of the pixels to provide more resolution. In the preferred embodiment the offset is ½ pitch to effectively reduce the pixel spacing by a half in the horizontal direction.

Figure 10:
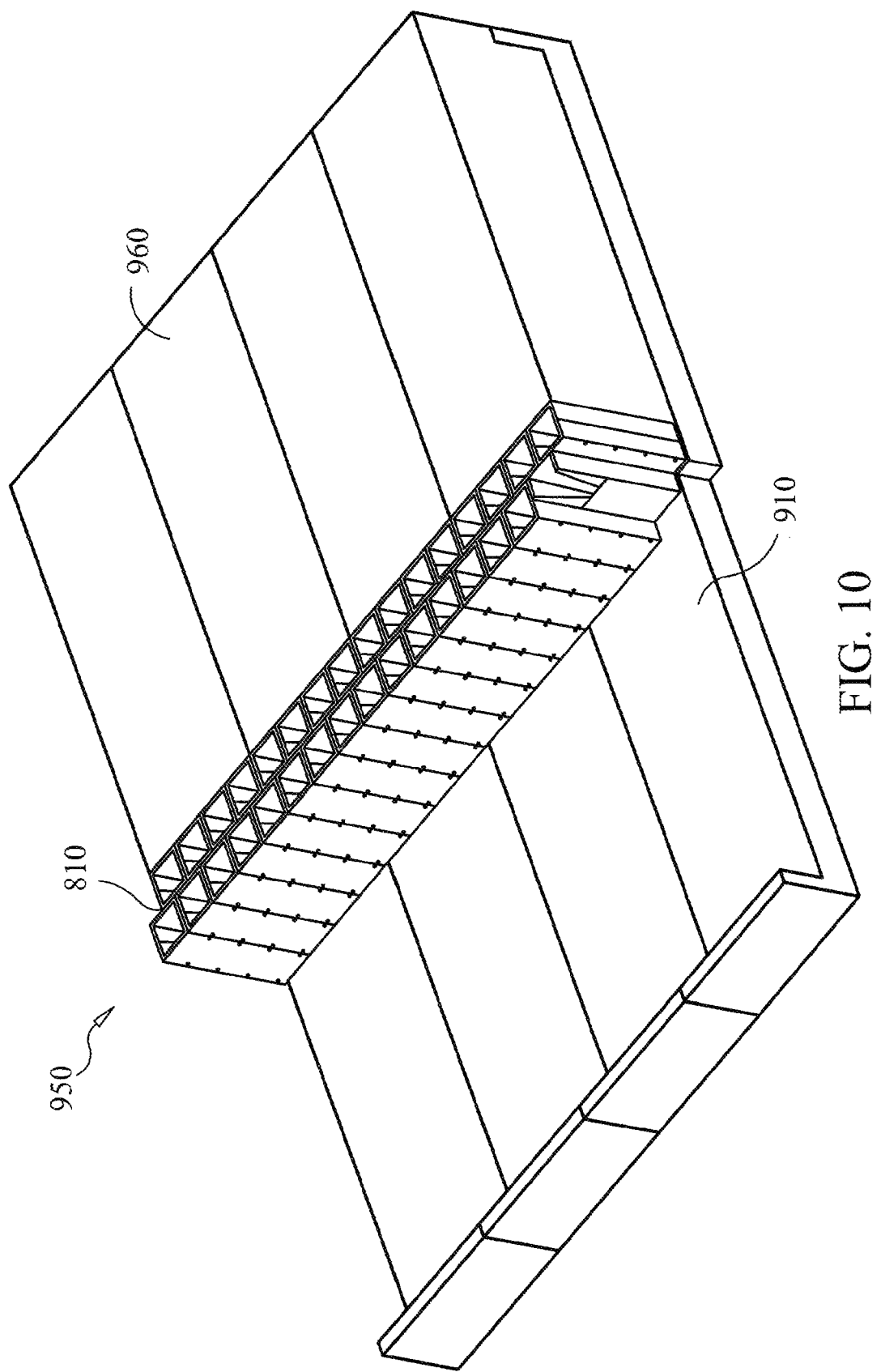
FIG. 10 shows a conceptual view of a thirty-two pixel radiometer in accordance with the present invention.

FIG. 10 is a multi channel radiometer 950 in accordance with the present invention showing an expansion to thirty-two pixels in the focal plane array. Accordingly, the resolution of a millimeter wave is increased with the addition of pixels coupled to an RF board. A portion of housing 960 is shown to illustrate that radiometer 950 is enclosed to protect electrical components.

Readily understandable diagrams of the present invention described herein illustrate the configurations of the imaging and video processing circuits and components and the manner in which they are interfaced with conventional display equipment. The diagrams show those specific details that are pertinent to the present invention so as not to obscure the disclosure with details, which will be readily apparent to those skilled in the art of having the benefit of the description herein. Thus, the diagrams shown in the drawings are primarily intended to show the various components of the invention in convenient functional groupings, so that the present invention may be more readily understood.

Further, the present invention has been described with reference to flow diagrams and/or block diagrams of methods according to preferred embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

Now that the invention has been described,
What is claimed is:

1. A method of detecting concealed objects on an individual, the method comprising:
    scanning an imaging zone for millimeter wave energy radiating therefrom using a system having a reflective surface configured to oscillate, said oscillating reflective surface arranged to sequentially reflect the millimeter wave energy radiating from the imaging zone to an array of pixels through an optical lens;
    correlating movement of the oscillating reflective surface to coordinates in the imaging zone to determine the millimeter wave energy at specific coordinates of the imaging zone;
    receiving the reflected millimeter wave energy at the array of pixels;
    calculating values for a grid of cells, the value of each cell representing the reflected millimeter wave energy received at one pixel of the array of pixels;
    analyzing differences between the values of the millimeter wave energy between the cells of the grid;
    identifying contrast cells from the grid of cells, the contrast cells having values of the reflected millimeter wave energy with a predetermined difference between adjacent cells;
    forming a discrete image of the contrast cells;
    synchronizing the discrete image of contrast cells with a video image of the imaging zone;
    generating a real-time composite image so that the specific coordinates of the video image of the imaging zone are overlaid with corresponding cells in the discrete image of the contrast cells; and
    displaying said composite image.

2. The method of claim 1, wherein said receiving the reflected millimeter wave energy comprises receiving the reflected millimeter wave energy using a multi-channel radiometer.

3. The method of claim 1, wherein said scanning for millimeter wave energy comprises scanning for millimeter wave energy between 80 and 100 GHz.

4. An imaging apparatus, comprising:
    a video imaging system configured to obtain a video image of an imaging zone;
    a scanner having a reflecting surface and an optical lens;
    a multi-channel radiometer comprising an array of pixels and coupled with the scanner;
    a processor coupled with the video imaging system, the scanner, and the multi-channel radiometer; and
    a monitor coupled with the processor;
    said scanner reflective surface configured to oscillate, said oscillating reflective surface arranged to sequentially reflect received millimeter wave energy radiating from a portion of the imaging zone to the array of pixels of said multi-channel radiometer through the optical lens,
    said processor configured to:
    correlate movement of the reflective surface in the scanner to coordinates in the imaging zone so as to determine the millimeter wave energy at specific coordinates of the imaging zone;
    calculate values for a grid of cells, the value of each cell representing millimeter wave energy received by one pixel of the array of pixels in the multi-channel radiometer;
    identify contrast cells from the grid of cells, the contrast cells identified as adjacent cells having values of the millimeter wave energy with a predetermined difference;
    form a discrete image of the identified contrast cells;
    synchronize the discrete image of contrast cells with the video image of the imaging zone;
    generate a composite image of the video image overlaid with the discrete image of contrast cells such that the specific coordinates of the video image of the imaging zone are overlaid with corresponding cells in the discrete image of the contrast cells; and
    display the composite image on said monitor.

5. The apparatus of claim 4, wherein the composite image is a real-time composite image.

6. The apparatus of claim 4, wherein the multi-channel radiometer comprises a radio frequency (RF) board electrically coupled to each pixel of the array of pixels.

7. The apparatus of claim 6, wherein the multi-channel radiometer further comprises a plurality of low noise amplifiers each associated with a respective pixel.

8. The apparatus of claim 6, wherein the multi-channel radiometer further comprises a plurality of RF switches each coupled between an antennae and a receiver of the respective pixel.

9. The apparatus of claim 4, wherein the millimeter wave energy is between 80 and 100 GHz.

* * * * *